(12) United States Patent
Ishihara

(10) Patent No.: US 11,909,067 B2
(45) Date of Patent: Feb. 20, 2024

(54) BATTERY PACK AND AIRCRAFT

(71) Applicant: HONDA MOTOR CO., LTD., Tokyo (JP)

(72) Inventor: Yuya Ishihara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 2 days.

(21) Appl. No.: 17/688,936

(22) Filed: Mar. 8, 2022

(65) Prior Publication Data

US 2022/0302550 A1 Sep. 22, 2022

(30) Foreign Application Priority Data

Mar. 22, 2021 (JP) ................. 2021-047371

(51) Int. Cl.
| | |
|---|---|
| *H01M 50/367* | (2021.01) |
| *H01M 10/613* | (2014.01) |
| *H01M 10/625* | (2014.01) |
| *H01M 10/6567* | (2014.01) |
| *H01M 50/691* | (2021.01) |
| *B60L 58/26* | (2019.01) |

(52) U.S. Cl.
CPC ......... *H01M 50/367* (2021.01); *B60L 58/26* (2019.02); *H01M 10/613* (2015.04); *H01M 10/625* (2015.04); *H01M 10/6567* (2015.04); *H01M 50/691* (2021.01); *B60L 2200/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2015/0255838 A1* | 9/2015 | Inoue | H01M 10/625 429/62 |
| 2017/0018748 A1 | 1/2017 | Matsuura | |
| 2017/0259937 A1* | 9/2017 | Plessner | H01M 50/3425 |
| 2020/0280030 A1* | 9/2020 | Waha | H01M 50/30 |
| 2020/0371569 A1* | 11/2020 | Mao | H05K 7/20272 |

FOREIGN PATENT DOCUMENTS

JP 2017-22050 1/2017

* cited by examiner

*Primary Examiner* — Lisa S Park
(74) *Attorney, Agent, or Firm* — Amin, Turocy & Watson, LLP

(57) ABSTRACT

In a battery pack, a housing includes an exhaust portion provided on an upper side in a gravity direction with respect to a housing portion that houses a live part. The exhaust portion includes: a storage portion configured to store a liquid; a first communication portion that communicates between an interior of the housing portion and an interior of the exhaust portion; and a second communication portion that communicates between an outside of a housing and an inside of the exhaust portion. When the battery pack is viewed from the upper side in the gravity direction, an opening of the second communication portion on an inner side of the exhaust portion is provided at a position that overlaps the storage portion and that does not overlap an opening of the first communication portion on the inner side of the exhaust portion.

6 Claims, 6 Drawing Sheets

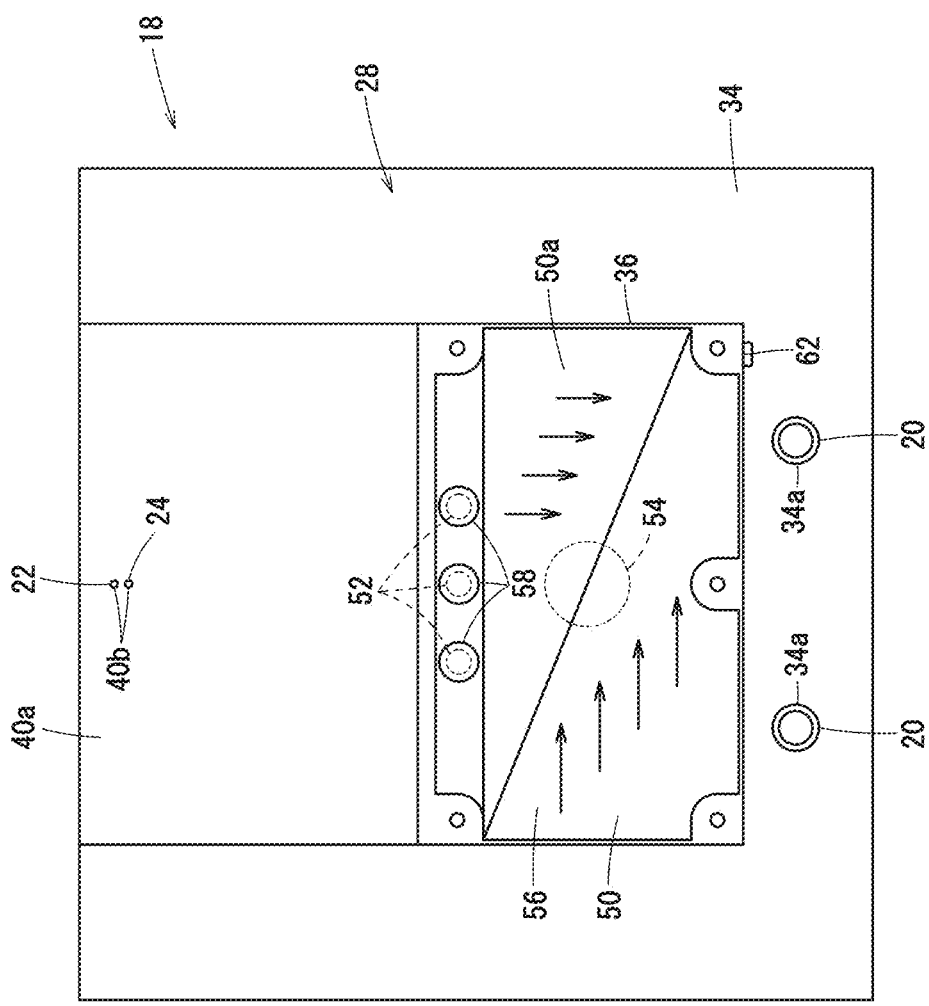
FIG. 5
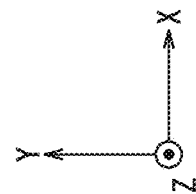

BATTERY PACK AND AIRCRAFT

CROSS-REFERENCE TO RELATED APPLICATIONS

This application is based upon and claims the benefit of priority from Japanese Patent Application No. 2021-047371 filed on Mar. 22, 2021, the contents of which are incorporated herein by reference.

BACKGROUND OF THE INVENTION

Field of the Invention

The present invention relates to a battery pack and an aircraft.

Description of the Related Art

JP 2017-022050 A discloses a non-aqueous secondary battery. The non-aqueous secondary battery has a gas release valve in a battery case. The gas release valve has a valve element that closes a communication passage that communicates between the outside and the inside of the battery case. The valve element is pressed by a coil spring in a direction to close the communication passage. When the internal pressure of the battery case reaches a predetermined pressure value, the communication passage is opened by the valve element, and the gas in the battery case is discharged to the outside through the communication passage.

SUMMARY OF THE INVENTION

In JP 2017-022050 A, a water absorbing material is provided in the communication passage. The water absorbing material absorbs water that has entered the communication passage when the valve element opens the communication passage. When the internal pressure of the porous battery case and the elastic force of the coil spring are balanced, the communication passage is opened over a long period of time. For this reason, the porous water absorbing material cannot absorb water completely, and there is a concern that water may enter the battery case.

An object of the present invention is to solve the above-described problems.

An aspect of the present invention is a battery pack including: a housing; and a live electrical part housed in the housing. The housing includes: a housing portion in which the live electrical part is housed; and an exhaust portion provided on an upper side in a gravity direction with respect to the housing portion in a state where the battery pack is placed. The exhaust portion includes: a storage portion configured to store a liquid; a first communication portion that communicates between an interior of the housing portion and an interior of the exhaust portion; and a second communication portion that communicates between an outside of the housing and an inside of the exhaust portion. When the battery pack is viewed from the upper side in the gravity direction, an opening of the second communication portion on an inner side of the exhaust portion is provided at a position that overlaps the storage portion and that does not overlap an opening of the first communication portion on the inner side of the exhaust portion.

According to the present invention, it is possible to suppress entry of liquid into the housing portion in which the live part is housed.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a top view of the battery pack; and

DESCRIPTION OF THE INVENTION

First Embodiment

Figure 1:
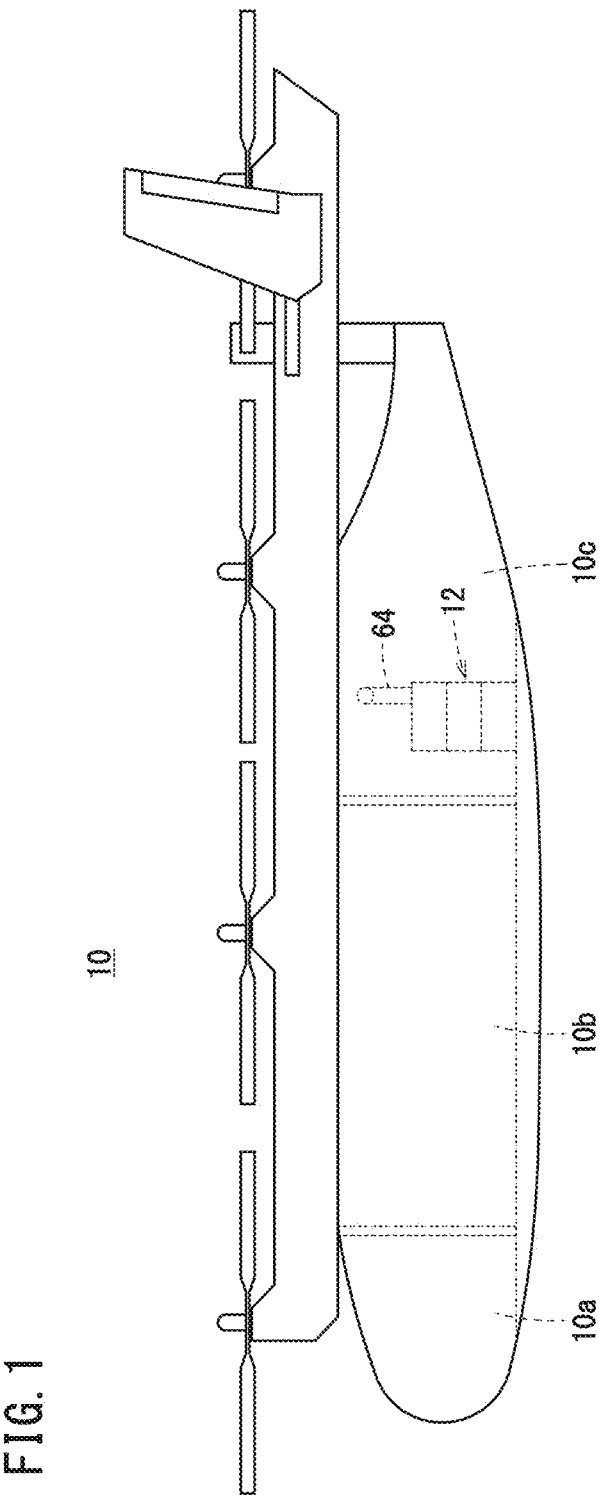
FIG. 1 is a schematic view showing an aircraft equipped with a battery pack.
Figure 2:
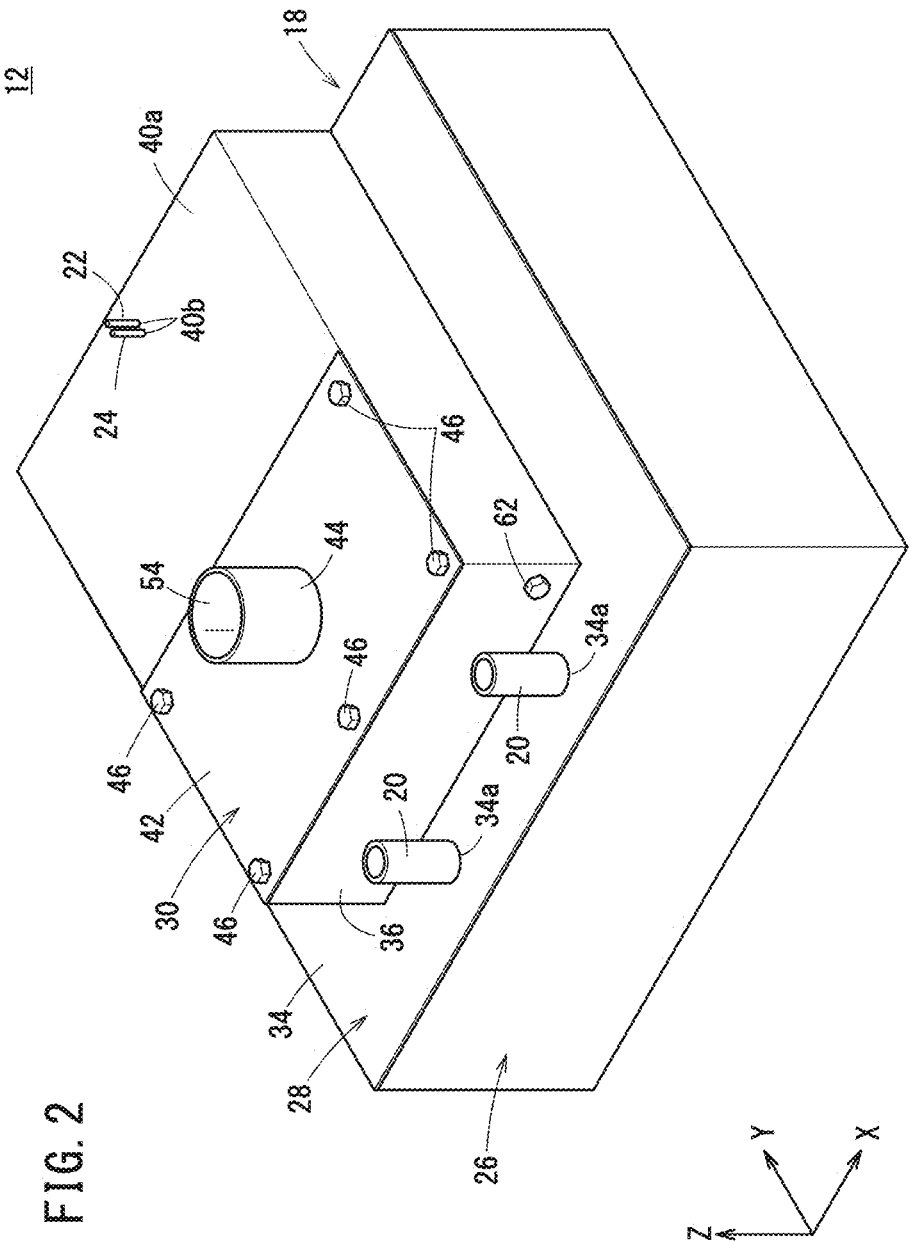
FIG. 2 is a perspective view of the battery pack.
Figure 3:
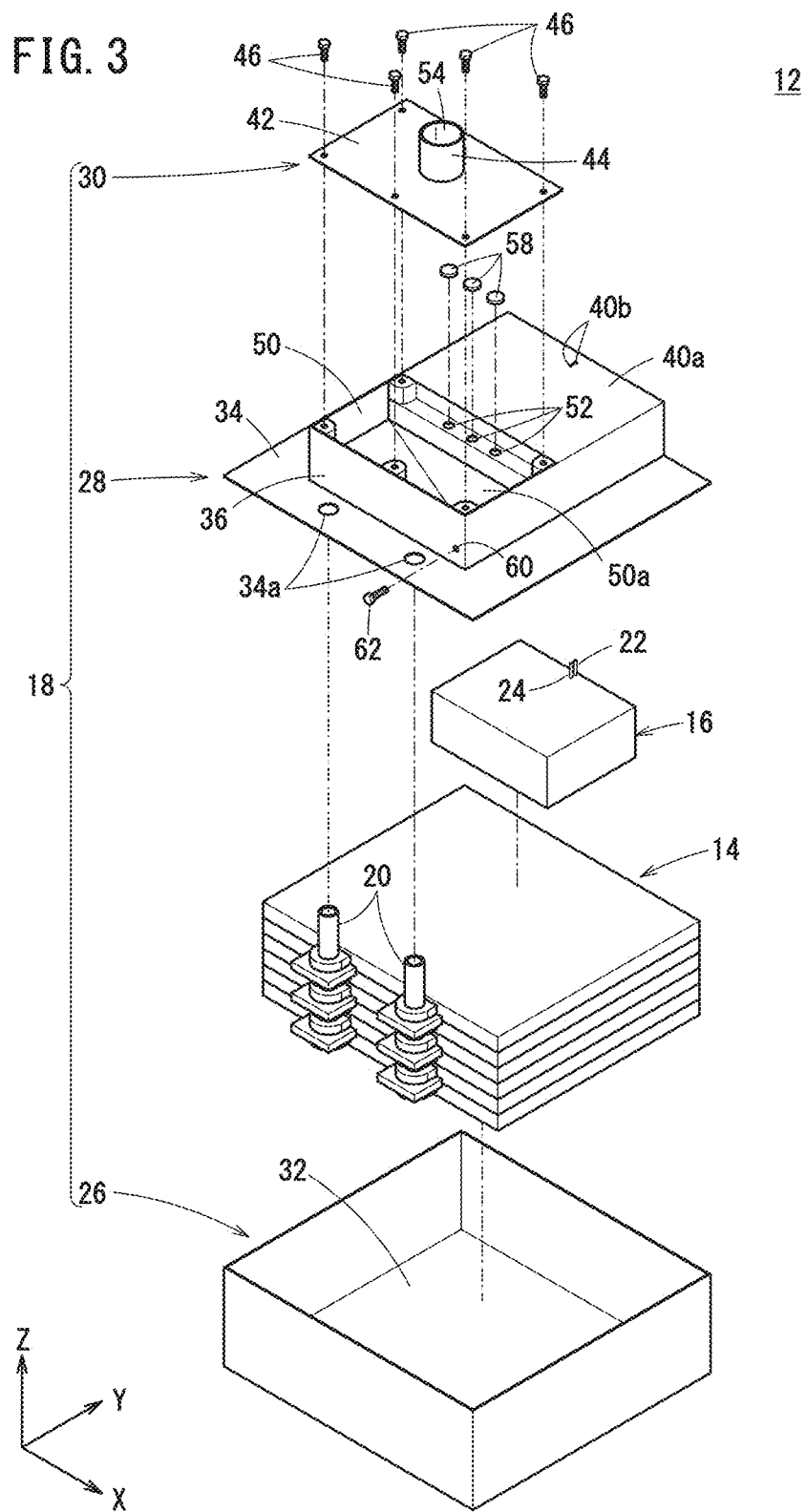
FIG. 3 is an exploded perspective view of the battery pack.

FIG. 1 is a schematic view showing an aircraft 10. The aircraft 10 is equipped with a battery pack 12. FIG. 2 is a perspective view of the battery pack 12. FIG. 3 is an exploded perspective view of the battery pack 12.

The aircraft 10 has a cockpit 10a, a cabin 10b, and a cargo compartment 10c, which are separated by partition walls, and a plurality of battery packs 12 are mounted in the cargo compartment 10c. The battery pack 12 is used as a power source for a drive source of the aircraft 10.

In the following description, the X axis, the Y axis, and the Z axis are set as shown in FIG. 2. During ground standby of the aircraft 10 or during horizontal flight of the aircraft 10, the Z-axis direction is substantially parallel to the direction of gravity. During ground standby of the aircraft 10 or during horizontal flight of the aircraft 10, the positive side in the Z-axis direction is the upper side.

As shown in FIG. 3, the battery pack 12 includes a live part (live electrical part) 14, a junction box 16, and a housing 18. The live part 14 is a battery module including a plurality of battery cells that are lithium ion batteries, a cooling water channel that cools the battery cells, and the like. The live part 14 has water supply and discharge nozzles 20 for supplying and discharging the cooling water of the cooling water channel. As shown in FIG. 2, the water supply and discharge nozzles 20 are provided extending in the Z-axis direction.

Figure 4:
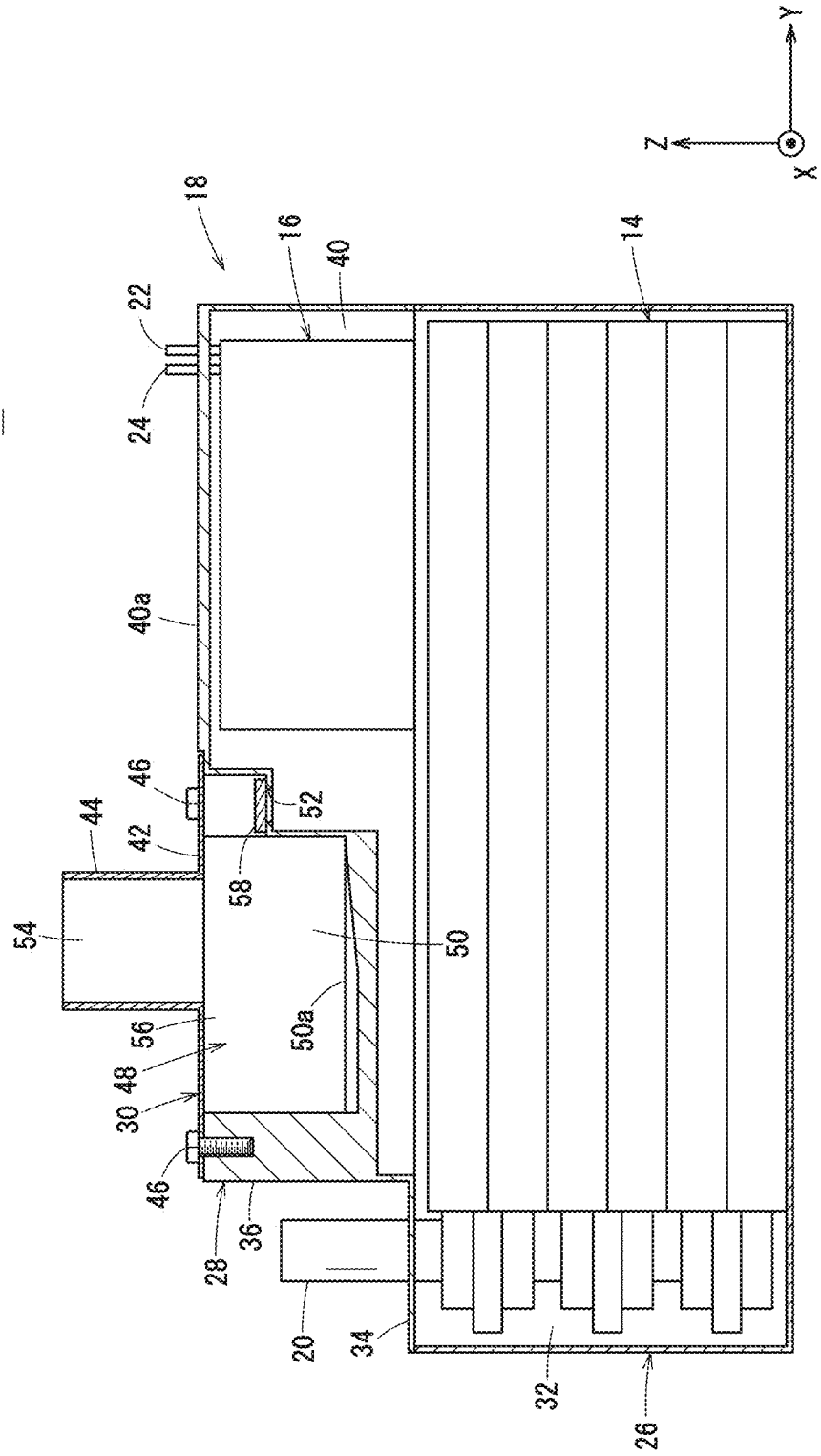
FIG. 4 is a cross-sectional view of the battery pack.

The junction box 16 includes a contactor, a current sensor, a battery management system, and the like. The junction box 16 is connected to the positive electrode and the negative electrode of each battery cell of the live part 14. The junction box 16 has a positive electrode terminal 22 and a negative electrode terminal 24 for drawing electric power from the live part 14 to the outside of the battery pack 12 (FIGS. 4 and 5).

The housing 18 is made of titanium. The housing 18 includes a lower case 26, an upper case 28, and a cover 30.

The lower case 26 is a substantially rectangular parallelepiped box body whose surface on the positive side in the Z-axis direction is open. The lower case 26 includes, formed therein, a housing portion 32 housing the live part 14.

The upper case 28 has a lid portion 34 and an upright portion 36. The upper case 28 is fixed to a surface of the lower case 26 on the positive side in the Z-axis direction by welding. The method of joining the upper case 28 and the lower case 26 is not limited to welding. For example, a metal gasket, a liquid gasket, or the like may be used as the joining method.

The upper case 28 closes the opening of the lower case 26 with the lid portion 34. The upright portion 36 is formed in a convex shape extending from the lid portion 34 toward the positive side in the Z-axis direction.

A surface of the upright portion 36 on the positive side in the Z-axis direction is open (FIGS. 3 and 4). This opening is formed at a position closer to an end of the upright portion 36 on the negative side in the Y-axis direction than an end of the upright portion 36 on the positive side in the Y-axis direction. The upright portion 36 contains therein a storage portion 50 and the like, which will be described later. The storage portion 50 and the like are disposed at a position closer to the end of the upright portion 36 on the negative side in the Y-axis direction than the end of the upright portion 36 on the positive side in the Y-axis direction.

The surface of the upright portion 36 on the negative side in the Z-axis direction is open (FIG. 4). This opening is provided at a position closer to the end of the upright portion 36 on the positive side in the Y-axis direction than the end of the upright portion 36 on the negative side in the Y-axis direction. The upright portion 36 contains therein a junction box housing portion 40. The junction box housing portion 40 is provided at a position closer to the end of the upright portion 36 on the positive side in the Y-axis direction than the end of the upright portion 36 on the negative side in the Y-axis direction. The junction box 16 is inserted into the junction box housing portion 40 from the opening on the negative side in the Z-axis direction.

The cover 30 includes a lid portion 42 and a cylindrical portion 44. The cover 30 is fixed to a surface of the upper case 28 that is located on the positive side in the Z-axis direction by bolts 46. In the upper case 28, the opening on the positive side in the Z-axis direction of the upright portion 36 is closed with the lid portion 42. The cylindrical portion 44 is formed in a cylindrical shape extending from the lid portion 42 toward the Z-axis positive side.

Figure 6:
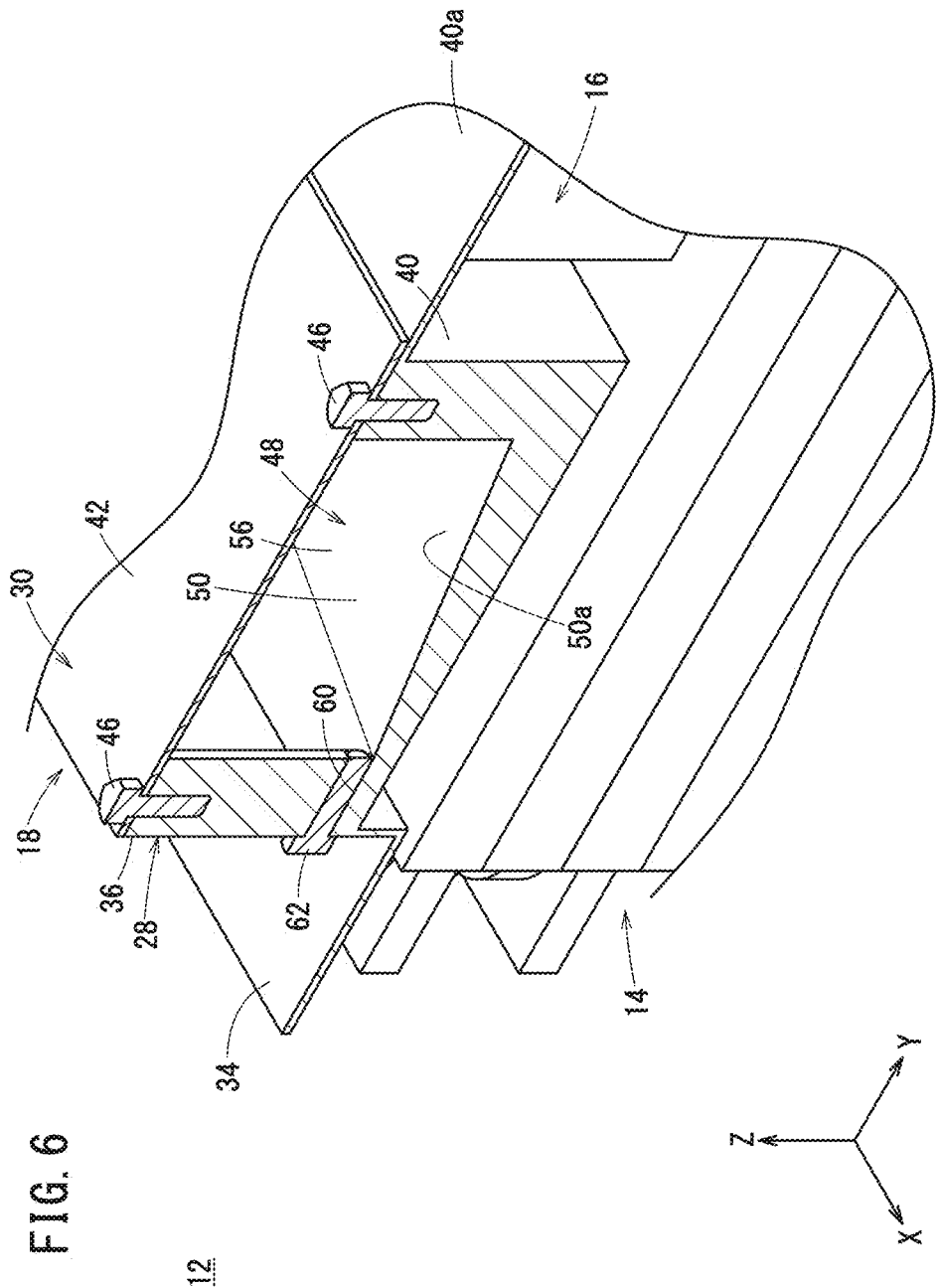
FIG. 6 is a cross-sectional perspective view of the battery pack.

FIG. 4 is a cross-sectional view of the battery pack 12 viewed from the positive side in the X-axis direction. FIG. 5 is a top view of the battery pack 12 viewed from the positive side in the Z-axis direction. FIG. 5 shows a state in which the cover 30 is removed. FIG. 6 is a cross-sectional perspective view of the battery pack 12.

Terminal holes 40b are formed in a top surface 40a of the junction box housing portion 40 of the upper case 28. The positive electrode terminal 22 and the negative electrode terminal 24 of the junction box 16 are exposed to the outside of the housing 18 through the terminal holes 40b.

Nozzle holes 34a are formed in the lid portion 34 of the upper case 28. The water supply and discharge nozzles 20 are exposed to the outside of the housing 18 from the nozzle holes 34a.

An exhaust portion 48 is formed by the cover 30 and the upper case 28. As shown in FIG. 4, the exhaust portion 48 is provided on the positive side in the Z-axis direction of the housing portion 32 that houses the live part 14. The exhaust portion 48 and the housing portion 32 are disposed apart from each other. In the Y-axis direction, the exhaust portion 48 is disposed between the water supply and discharge nozzles 20 and the junction box 16. The exhaust portion 48 includes the storage portion 50, a first communication portion 52, a second communication portion 54, and a third communication portion 56.

The first communication portion 52 is a hole formed in the upper case 28. The first communication portion 52 communicates between the housing portion 32 and the exhaust portion 48. The first communication portion 52 is positioned between the storage portion 50 and the junction box housing portion 40 in the Y-axis direction. The first communication portion 52 is provided at a position that is located on the positive side in the Z-axis direction with respect to the bottom surface 50a of the storage portion 50. A porous film 58 is attached to the first communication portion 52. The porous film 58 is attached to a portion of the first communication portion 52 that is located on the positive side in the Z-axis direction. The porous film 58 is made of fluorine resin. The porous film 58 has gas permeability and hydrophobicity.

When a force such as impact or pressure acts on the live part 14, or when overcharge, overdischarge, or the like occurs in the live part 14, the inside of the live part 14 may be short-circuited. The battery cell of the live part 14 is a lithium ion battery. In the battery cell of the live part 14, an organic solvent is used as a non-aqueous electrolytic solution. Therefore, when an internal short circuit occurs in the live part 14, gas may be generated. The first communication portion 52 is provided in order to send the gas from the housing portion 32 to the exhaust portion 48. The opening area and the number of the first communication portions 52 are set in accordance with the volume of air in the housing portion 32. More specifically, the opening area and the number of the first communication portions 52 are set so that the inside pressure of the housing portion 32 does not become negative pressure. In the present embodiment, as shown in FIG. 5, three first communication portions 52 are provided.

The second communication portion 54 is a hollow portion formed by the cylindrical portion 44 of the cover 30. The second communication portion 54 communicates between the inside of the exhaust portion 48 and the outside of the housing 18. The second communication portion 54 is disposed on the positive side in the Z-axis direction with respect to the storage portion 50. The gas sent to the exhaust portion 48 is discharged to the outside of the housing 18 through the second communication portion 54. In FIG. 5, the opening of the second communication portion 54 on the negative side in the Z-axis direction is indicated by a dotted line. As shown in FIG. 5, when the battery pack 12 is viewed from the positive side in the Z-axis direction, the opening of the second communication portion 54 on the negative side in the Z-axis direction is provided at a position overlapping the storage portion 50. On the other hand, the opening of the second communication portion 54 on the negative side in the Z-axis direction is provided at a position that does not overlap the opening of the first communication portion 52 on the positive side in the Z-axis direction.

In other words, the positive side in the Z-axis direction of the first communication portion 52 can be also referred to as a side of the first communication portion 52 that is closer to the storage portion 50. In other words, the positive side in the Z-axis direction of the first communication portion 52 can be also referred to as a side of the first communication portion 52 that is located on the inner side of the exhaust portion 48. In other words, the negative side in the Z-axis direction of the second communication portion 54 described above can be also referred to as a side of the second communication portion 54 that is closer to the storage portion 50. In other words, the negative side in the Z-axis direction of the second communication portion 54 can be also referred to as a side of the second communication portion 54 that is located on the inner side of the exhaust portion 48.

The third communication portion 56 is a space provided between the storage portion 50 and the second communication portion 54 in the Z-axis direction. The third communication portion 56 communicates between the storage portion 50, the first communication portion 52, and the second communication portion 54.

The storage portion 50 stores liquid such as water that enters from the second communication portion 54. As shown in FIG. 6, the storage portion 50 has a drain hole 60 that enables the outside of the housing 18 to communicate with the inside of the storage portion 50, on a side surface, of the storage portion, that is located on the negative side in the Y-axis direction. The drain hole 60 is formed at a position lower than the bottom surface 50a of the storage portion 50. The drain hole 60 is opened in a surface that faces the water supply and discharge nozzles 20, of the outer surfaces of the upright portion 36. A drain bolt 62 is fitted into an opening of the drain hole 60.

As shown in FIGS. 4 and 6, the bottom surface 50a of the storage portion 50 is formed to be inclined toward the negative side in the Z-axis direction, in the direction of approaching the drain hole 60. When the drain bolt 62 is pulled out from the drain hole 60, as indicated by an arrow in FIG. 5, the liquid stored in the storage portion 50 flows and is discharged to the outside of the housing 18. The volume of the storage portion 50 is set such that the porous film 58 does not soak in the stored liquid even when the liquid is not discharged from the drain hole 60 for a prescribed period.

As shown in FIG. 1, the aircraft 10 includes an exhaust pipe 64. The exhaust pipe 64 communicates between the second communication portion 54 and the outside of the aircraft 10. The gas generated in the live part 14 is finally discharged from the exhaust pipe 64 to the outside of the aircraft 10.

In the present embodiment, an example in which the battery pack 12 is used as a power source for a drive source of the aircraft 10 has been described, but the battery pack 12 may be used for other purposes. For example, the battery pack 12 may be used as a power source for a drive source of an electric automobile, an electric motorcycle, or the like. Further, the battery pack 12 may be used as a power source for a driving source of an electric lawn mower, an electric blower, or the like. Furthermore, the battery pack 12 may be used in a power storage system installed in a building, a public facility, a house, or the like.

[Action and Effects]

The battery pack 12 needs to have a structure for discharging gas generated by an internal short circuit or the like of the live part 14, to the outside. On the other hand, when liquid such as water enters the live part 14, a short circuit may occur inside the live part 14. Therefore, in the battery pack 12, it is necessary to achieve both discharge of gas to the outside of the battery pack 12 and suppression of entry of liquid into the inside of the battery pack 12, particularly into the live part 14.

As such, the battery pack 12 of the present embodiment has the exhaust portion 48 on the upper side in the gravity direction with respect to the live part 14. The exhaust portion 48 has a storage portion 50 for storing liquid, a first communication portion 52 that enables the inside of the housing portion 32 to communicate with the inside of the exhaust portion 48, and a second communication portion 54 that enables the inside of the exhaust portion 48 to communicate with the outside of the housing 18. When the battery pack 12 is viewed from the upper side in the gravity direction (the positive side in the Z-axis direction), the opening of the second communication portion 54 on the negative side in the Z-axis direction is provided at a position that overlaps the storage portion 50 and that does not overlap the opening of the first communication portion 52 on the positive side in the Z-axis direction. Accordingly, it is possible to achieve both discharge of gas to the outside of the battery pack 12 and suppression of entry of liquid into the live part 14.

In the battery pack 12 of the present embodiment, the opening of the first communication portion 52 on the negative side in the Z-axis direction is provided above the storage portion 50 in the gravity direction, i.e., on the upper side in the gravity direction with respect to the storage portion 50. Accordingly, it is possible to suppress movement of liquid from the storage portion 50 to the first communication portion 52, and to suppress the entry of the liquid into the live part 14.

The battery pack 12 of the present embodiment includes the third communication portion 56. The third communication portion 56 is provided between the storage portion 50 and the second communication portion 54 in the gravity direction (the Z-axis direction). The third communication portion 56 communicates between the storage portion 50, the first communication portion 52, and the second communication portion 54. Since the storage portion 50, the first communication portion 52, and the second communication portion 54 communicate with each other through the third communication portion 56, gas can move from the first communication portion 52 to the second communication portion 54, and liquid can move from the second communication portion 54 to the storage portion 50. In addition, since the storage portion 50, the first communication portion 52, and the second communication portion 54 communicate with each other through the third communication portion 56, on the upper side of the storage portion 50 in the gravity direction, it is difficult for the liquid to move from the storage portion 50 to the first communication portion 52. Therefore, entry of liquid into the live part 14 is suppressed.

In addition, in the battery pack 12 of the present embodiment, in the direction toward the drain hole 60, the bottom surface 50a of the storage portion 50 is inclined downward in the gravity direction (i.e., toward the negative side in the Z-axis direction). As a result, more liquid stored in the storage portion 50 can be discharged from the drain hole 60.

When the battery pack 12 is viewed from a side, the exhaust portion 48 is disposed so as to be sandwiched between the water supply and discharge nozzle 20 and the junction box 16 in the horizontal direction (Y-axis direction) orthogonal to the gravity direction. This makes it possible to separate the water supply and discharge nozzle 20 from the junction box 16. As a result, adhesion of cooling water to the positive electrode terminal 22 and the negative electrode terminal 24 of the junction box 16 can be suppressed.

The aircraft 10 on which the battery pack 12 of the present embodiment is mounted includes an exhaust pipe 64 that enables the second communication portion 54 to communicate with the outside of the aircraft 10. As a result, the gas generated in the live part 14 can be discharged to the outside of the aircraft 10.

Invention Obtained from Embodiment

A battery pack (12) includes: a housing (18); and a live electrical part (live part) (14) housed in the housing. The housing includes: a housing portion (32) in which the live electrical part is housed; and an exhaust portion (48) provided on an upper side in a gravity direction with respect to the housing portion in a state where the battery pack is placed. The exhaust portion includes: a storage portion (50) configured to store a liquid; a first communication portion (52) that communicates between an interior of the housing portion and an interior of the exhaust portion; and a second communication portion (54) that communicates between an outside of the housing and an inside of the exhaust portion. When the battery pack is viewed from the upper side in the gravity direction, an opening of the second communication portion on an inner side of the exhaust portion is provided at a position that overlaps the storage portion and that does not overlap an opening of the first communication portion on the inner side of the exhaust portion.

In the above battery pack, the opening of the second communication portion on the inner side of the exhaust portion may be provided on the upper side in the gravity direction with respect to the storage portion.

The above-described battery pack may further include a third communication portion (56) that is provided between the storage portion and the second communication portion in the gravity direction and that enables the storage portion, the first communication portion, and the second communication portion to communicate with each other.

In the above-described battery pack, the storage portion may include a drain hole (60) on a bottom surface side of a side surface thereof, the drain hole allowing an outside of the housing and an inside of the storage portion to communicate with each other, and in a direction toward the drain hole, a bottom surface of the storage portion may be inclined downward in the gravity direction.

The battery pack may further include: a water supply and discharge nozzle (20) configured to supply and discharge cooling water for cooling the live electrical part; and a junction box (16) to which electrodes of the live part are connected, and when the battery pack is viewed from a side thereof, the exhaust portion may be disposed between the water supply and discharge nozzle and the junction box in a horizontal direction orthogonal to the gravity direction.

An aircraft (10) equipped with the above-described battery pack may include an exhaust pipe (64) that communicates between the second communication portion and the outside of the aircraft.

The present invention is not particularly limited to the embodiment described above, and various modifications are possible without departing from the essence and gist of the present invention.

What is claimed is:

1. A battery pack comprising:
a housing; and
a live electrical part housed in the housing,
wherein
the housing includes:
a housing portion in which the live electrical part is housed; and
an exhaust portion provided on an upper side in a gravity direction with respect to the housing portion in a state where the battery pack is placed,
wherein
the exhaust portion includes:
a storage portion configured to store a liquid;
a first communication portion that communicates between an interior of the housing portion and an interior of the exhaust portion; and
a second communication portion that communicates between an outside of the housing and an inside of the exhaust portion, and
wherein
when the battery pack is viewed from the upper side in the gravity direction, an opening of the second communication portion on an inner side of the exhaust portion is provided at a position that overlaps the storage portion and that does not overlap an opening of the first communication portion on the inner side of the exhaust portion,
an opening of the first communication portion on an inner side of the exhaust portion is provided at a position that is located on the upper side in the gravity direction with respect to a bottom surface of the storage portion, and
the first communication portion is provided at a position that is located on a lower side in the gravity direction with respect to the opening of the second communication portion on the inner side of the exhaust portion.

2. The battery pack according to claim 1, wherein
the opening of the second communication portion on the inner side of the exhaust portion is provided on the upper side in the gravity direction with respect to the storage portion.

3. The battery pack according to claim 1, further comprising:
a third communication portion that is provided between the storage portion and the second communication portion in the gravity direction and that enables the storage portion, the first communication portion, and the second communication portion to communicate with each other.

4. The battery pack according to claim 1, wherein
the storage portion includes a drain hole on a bottom surface side of a side surface thereof, the drain hole allowing an outside of the housing and an inside of the storage portion to communicate with each other, and
in a direction toward the drain hole, a bottom surface of the storage portion is inclined downward in the gravity direction.

5. The battery pack according to claim 1, further comprising:
a water supply and discharge nozzle configured to supply and discharge cooling water for cooling the live electrical part; and
a junction box to which electrodes of the live electrical part are connected,
wherein
when the battery pack is viewed from a side thereof, the exhaust portion is disposed between the water supply and discharge nozzle and the junction box in a horizontal direction orthogonal to the gravity direction.

6. An aircraft equipped with a battery pack, the battery pack including: a housing; and a live electrical part housed in the housing,
wherein
the housing includes:
a housing portion in which the live electrical part is housed; and
an exhaust portion provided on an upper side in a gravity direction with respect to the housing portion in a state where the battery pack is placed,
wherein
the exhaust portion includes:
a storage portion configured to store a liquid;
a first communication portion that communicates between an interior of the housing portion and an interior of the exhaust portion; and
a second communication portion that communicates between an outside of the housing and an inside of the exhaust portion, and wherein when the battery pack is viewed from the upper side in the gravity direction, an opening of the second communication portion on an inner side of the exhaust portion is provided at a position that overlaps the storage portion and that does not overlap an opening of the first communication portion on the inner side of the exhaust portion, an opening of the first communication portion on an inner side of the exhaust portion is provided at a position that is located on the upper side in the gravity direction with respect to a bottom surface of the storage portion, and the first communication portion is provided at a position that is located on a lower side in the gravity direction with respect to the opening of the second communication portion on the inner side of the exhaust portion, the aircraft comprising:

an exhaust pipe that communicates between the second communication portion and an outside of the aircraft.

\* \* \* \* \*